May 23, 1950
T. P. SIMPSON ET AL
2,509,019
METHOD AND APPARATUS FOR CONVERSION OF
HYDROCARBONS WITH MOVING BED OF SOLIDS
Original Filed Sept. 21, 1943
2 Sheets-Sheet 2
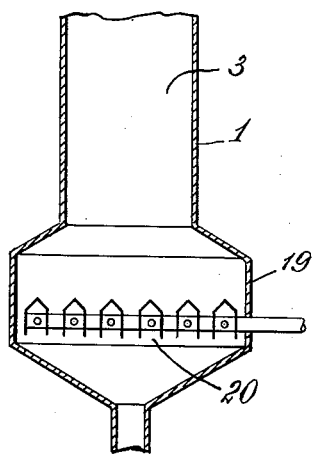
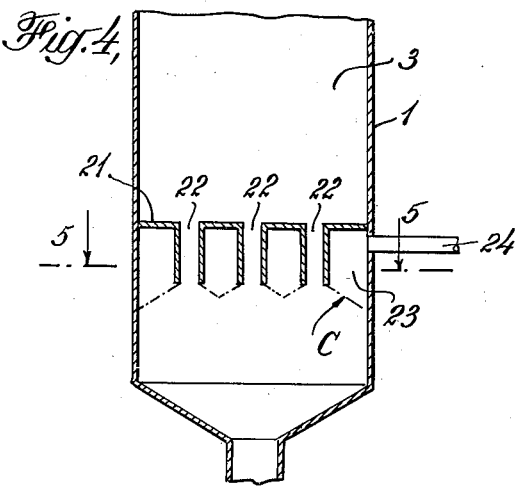
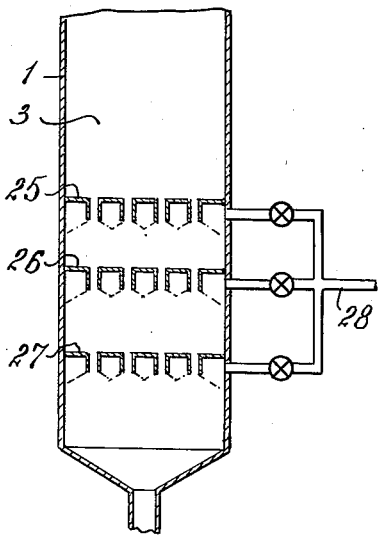
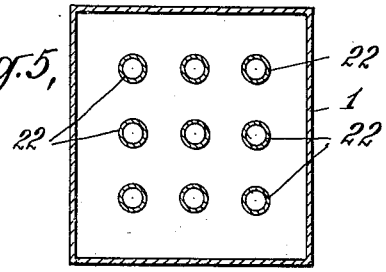
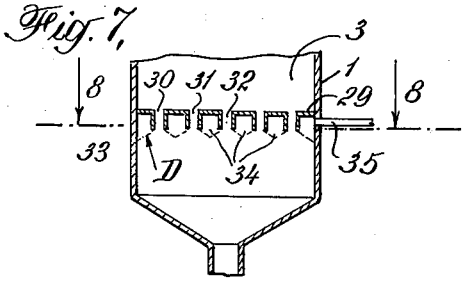
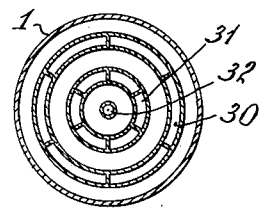
INVENTORS
THOMAS P. SIMPSON,
RUSSELL LEE,
FREDERICK E. RAY
BY John A. Crowley, Jr.
AGENT OR ATTORNEY Patented May 23, 1950

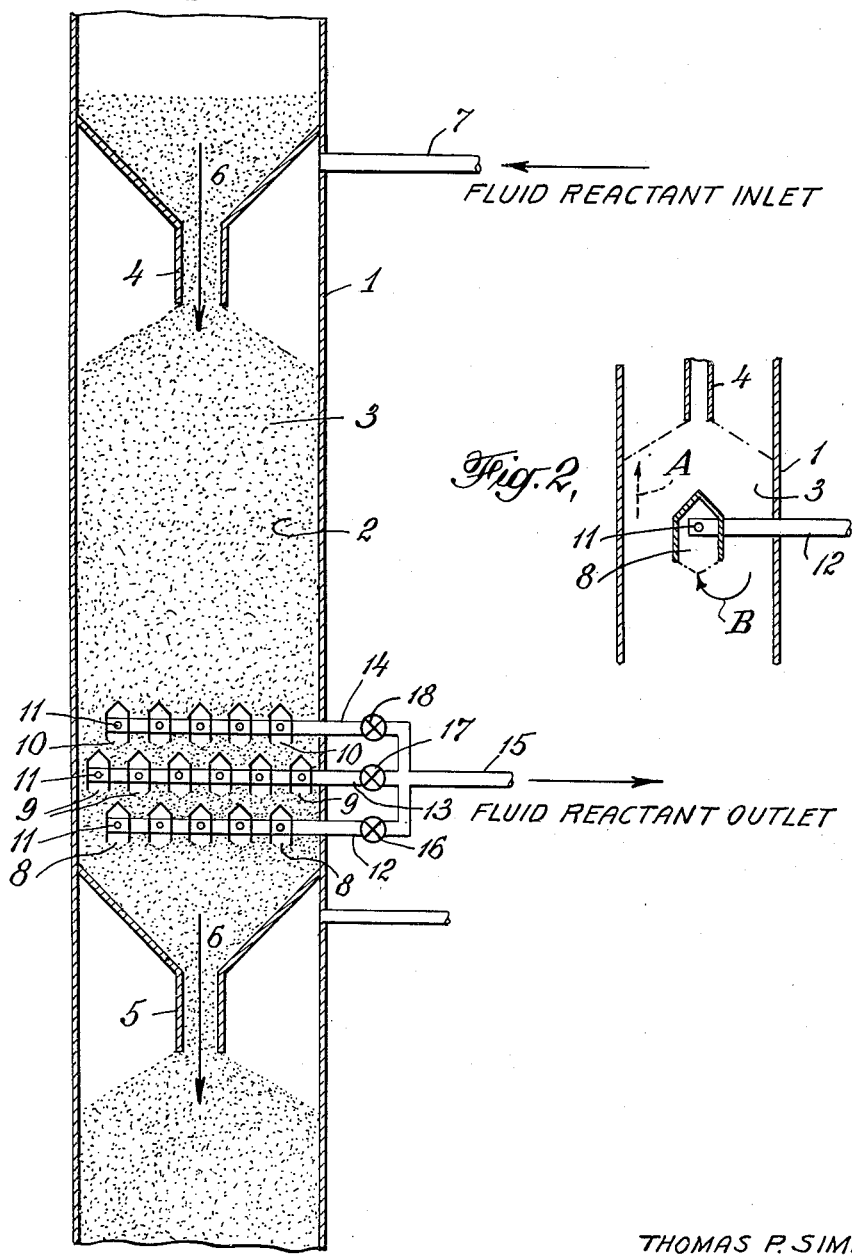

2,509,019

UNITED STATES PATENT OFFICE 2,509,019

METHOD AND APPARATUS FOR CONVERSION OF HYDROCARBONS WITH MOVING BED OF SOLIDS

Thomas P. Simpson and Frederick E. Ray, Woodbury, and Russell Lee, Wenonah, N. J., assignors to Socony-Vacuum Oil Company, Incorporated, a corporation of New York Original application September 21, 1943, Serial No. 503,188, now Patent No. 2,439,348, dated April 6, 1948. Divided and this application November 22, 1946, Serial No. 711,754

10 Claims. (Cl. 196—52)

This application is a true division of application Serial Number 503,188, filed in the United States Patent Office on September 21, 1943, and which issued as Patent No. 2,439,348 on April 6, 1948.

As is well known, hydrocarbons may be converted by contacting them at appropriate conditions with adsorptive contact masses. Such a process is the catalytic vapor phase cracking of gas oil to gasoline in the presence of particle-form contact masses of the general nature of clays. For example, gas oil vapors at temperatures in the neighborhood of 850° F., in the presence of such a contact mass, may be cracked to yield around 40% by volume of gasoline, a few per cent of permanent gases, and a small amount of coke which is deposited upon the contact mass, the remainder of the charge being largely unaffected and reappearing as a gas oil of a nature substantially similar to that which was charged. The deposit of coke reduces the activity of the contact mass, and periodic regeneration is required. Many installations hold the contact mass in place and effect regeneration in situ. More recently, there have been developed processes in which the particle-form contact mass flows in a stream through a zone where it is contacted with hydrocarbons and a reaction is continuously carried out, and then through a zone in which regeneration is continuously carried out. This invention has to do with processes of this latter type.

The contact masses used in such processes partake generally of the nature of clays or adsorptives, and include natural clays such as fullers' earth, refined natural clays, acid treated clays, synthetic associations of alumina and silica approximating clays, similar adsorptive synthetic materials such as gels of alumina and/or silica, and co-precipitated gels of these and other materials, any of which may or may not have added material such as metallic oxide, acids, etc., incorporated in or carried in the base contact mass for special purposes in connection with the contemplated reaction.

The reactions which may be carried out are most commonly cracking, reforming and similar operations, but may be alkylation, dealkylation, hydrogenation, dehydrogenation, isomerization, polymerization, oxidation, and the like.

A very efficient moving contact mass type of catalytic conversion utilizes the contact mass in the form of a moving, compact bed. In this operation, the more usual procedure at present is to flow the reactant countercurrent to the downwardly moving contact mass. In such countercurrent flow, it is desirable to remain below certain limiting flow rates with regard to the reactant, both to avoid uneven flow through the bed, and to avoid actual disruption of the bed, particularly at reactant disengaging surfaces. However, this upper limit of reactant velocity within the bed imposes a limiting throughput or space velocity of reactant which is a needless bar to flexibility of operation.

This invention has for its object the provision of a process for the conversion of hydrocarbons in the presence of a moving particle-form solid contact mass material in which the fluid reactants flow concurrently with the contact mass material under such proportioning and control as to effect proper and efficient utilization of the contact mass material.

The operation contemplated may be understood more readily from consideration of the drawings attached to this specification, Figure 1 of which shows in diagram form a single stage of a reactor operated in the fashion under discussion. This may represent either a regeneration zone or a reaction zone, since the considerations of fluid reactant velocity, pressure drop, and the like are the same for both; or it may represent any one of the stages in either a multi-stage reactor or a multi-stage regenerator.

The other figures of the drawings are Figure 2, a diagram used in explanation, and Figures 3, 4, 5, 6, 7, and 8 which are utilized to show possible modifications of structure. All of these drawings are highly diagrammatic in form.

Turning to Figure 1 of the drawings, there is shown a shell 1, defining and enclosing a reaction space 2, in which there is maintained a moving compact column of particle-form contact mass material 3, supplied through pipe 4 and removed through pipe 5. The contact mass material moves downwardly as indicated by arrow 6. Fluid reactant is admitted to the reactor by pipe 7 into the free space above the surface of the contact mass column. Near the bottom of the contact mass column there are a number of inverted troughs 8, 9, 10 extending transversely of the column in a direction perpendicular to the section plane of the drawing. Each trough 8, 9, 10 connects through orifices 11 with a reaction product outlet manifold 12, 13, 14. Fluid reactant entering through pipe 7 passes downwardly through the contact mass column and into collector troughs 8, 9, 10.

Operation in this fashion has several advantages. First it permits the use of any desirable space velocity of fluid reactant, since there is available not only the normal capabilities arising from variation of reactant flow without change of depth of bed throughout a range wider than possible with countercurrent flow, but also the possibility of ready variation of bed depth.

Most interesting, however, is the capability of operation at relatively high rates of pressure drop per foot of linear passage through contact mass. The ability to use these gives rise to an ability to control diffusion and results related thereto to a degree not heretofore realized in processes of this kind and this feature differentiates over those processes heretofore proposed which have utilized concurrent flow in lower pressure drop ranges.

In order to take advantage of the higher throughputs allowed with use of higher pressure drops, certain features are necessary, an understanding of which may be gained by discussion of the small diagram shown in Figure 2. In this diagram, 1 is again the reactor shell, 4 the feed pipe for contact mass, 3 the column of contact mass within the reactor and 8 is a single collector or distributor trough attached to pipe 12. In the older type of operation, while the contact mass is flowing downwardly, reactant would be introduced through pipe 12 into the space under 8, would pass out into the contact mass and would be liberated from the contact mass column after passing upwardly therethrough into the space above the surface of the contact mass in the reactor. The amount of material which could be flowed in this manner without disruption of the column of contact mass would be determined by the pressure drop or conversely by the linear velocity of reactant within contact mass in that last portion of the contact mass immediately below the top boundary of the column. In other words, it would be the pressure drop or velocity in the region indicated by the arrow A. Now, let us assume that with the contact mass still flowing downwardly, we flow the reactants concurrently with the contact mass. The limiting rate of flow of reactant is determined, when using an open disengaging surface, that is, one wherein the contact mass assumes its own surface and is not confined by a screen or the like, by the pressure drop or conversely by the velocity in the last portion of the path of the reactant within the contact mass, that point, for example, indicated by the arrow B. From this, it may readily be seen that when the area of the disengaging surface under trough 8 is no greater than the area of the disengaging surface to which arrow A leads, then, no more reactant may be flowed concurrently than may be flowed countercurrently, since the characteristics of flow at the point where reactant flow may disrupt the contact mass body are substantially the same. If the area under trough 8 is substantially less than the upper surface of the contact mass column, substantially less reactant may be flowed concurrently than countercurrently, otherwise the disengaging surface to which arrow B points would be disrupted by turbulence or boiling and by an actual carrying away of particles with reactants. Consequently, in order to take advantage of the possibilities of high throughputs, available with concurrent flow, while still using unrestrained or unscreened disengaging surface, arrangements must be made whereby the total disengaging surface area is substantially greater than the cross-sectional area of the column of solid contact mass material in the reactor.

Returning to Figure 1, it will be noted that such arrangements have been made in that there have been provided several series of collector troughs, viz., 8, 9, and 10 under which total disengaging surface area is substantially in excess of the cross-sectional area of the contact mass column. Each of the collector troughs in each of the several levels is manifolded to provide a separate reactant collector pipe 12, 13, 14 for each level, these collector pipes being combined into a single fluid reactant outlet 15. Another feature here presents itself for attention. Should we attempt to operate a multi level collector with no more structure than has been discussed, it will be obvious that an attempt will be made by the reactants to pass preferentially into the collector troughs 10 in the upper level, the preference decreasing as the reactant proceeds down through the several collector trough levels. In order to avoid this, a series of valves 16, 17, 18 are installed on each of the several level manifolds as shown. These valves are then so adjusted as to secure even flow through all of the several levels. By even flow, we do not mean flow equal in amount, but rather such flow in the collector troughs of each level as will give like disengaging conditions below each trough. In practice, we have found that if the proportioning of flow is such that the flow in all levels above the bottommost is about equal, and the flow of any one of such levels is approximately 80–85% of that afforded at the bottommost level, substantially equal conditions of disengagement will occur. This desirable condition may be obtained in several ways. It may be obtained by a series of throttling valves on all lines, or the valve 16 may be dispensed with and 17 and 18 adjusted to balance the reactant offtake at such levels against the free offtake from the bottommost level or the job may be done more or less permanently by the establishment of orifices or similar flow resistance devices of proper size in the several lines.

Figures 3 to 8, inclusive, are concerned with modifications of structure, with optional constructions which may be used for the same purpose as that shown in Figure 1. For example, in Figure 3, the reactor shell 1, enclosing the contact mass column 3, may be enlarged in cross section near its base as at 19, to afford room for a single level of collector troughs 20 whose total area is sufficiently great to provide for the maximum design reactant flow.

In Figure 4, a very simple construction is shown which affords a disengaging surface substantially equal to the cross-sectional area of the column. In Figure 4, 1 is the reactant shell and 3, the contact mass column; near the bottom of the shell there is provided a partition plate 21, from which there depends a plurality of contact mass flow pipes 22. These pipes extend for some little distance below plate 21 before their contents are discharged into the bottom portion of the reactor. In this case, the disengaging surface is the surface designated by the arrow C, the reactants being released from the solid at this surface to be collected in space 23 and removed through outlet pipe 24.

Figure 5 is a cross section of the structure of Figure 4, taken at the level indicated showing how the various pipes 22 must be substantially uniformly distributed with respect to cross section of the reactor column. The device of Figure 4, alone, does not, in itself, offer any particular augmentation of disengaging surface area above the cross-sectional area of the column. For designs where a considerable increase is desired, the structure shown in Figure 4 may be utilized in a multiple level design, as indicated in Figure 6, wherein again 1 is a reactor shell, 3 the contact mass column and 25, 26, and 27 are a series of plates with dependent pipes, of the same nature as shown in Figure 4, the whole being arranged in a manner similar to that of the collector troughs in Figure 1, each disengaging level being similarly manifolded and valved into a single reactant outlet 28. Another version of reactant disengaging space construction similar in its essentials to that of Figure 4, but particularly preferable in reactors of circular cross section wherein it is sometimes difficult to secure adequate uniformity of contact mass flow with the plate and pipe arrangement of Figure 4, is shown in Figure 7, a cross section of which is shown in Figure 8, the two of which should be read together for complete understanding. In this construction, 1 again represents the reactor shell and 3 the contact mass column, while 29 is a partition plate pierced by appropriate orifices arranged in an annular concentric fashion, as shown by items 30, 31 and 32 in Figure 8. Each orifice has downwardly extending vertical walls 33, and the whole structure serves again to estabish a disengaging surface designated by an arrow D below a collector space 34 connected to the reactant outlet 35. This structure may also be utilized as a multiple level, large area, disengaging structure in a manner similar to that previously explained in connection with Figure 6 and Figure 1.

All of the structures herein discussed have a single feature in common, namely, the provision of a method whereby reactants may be flowed concurrently with a downwardly moving column of particle-form solid contact mass under conditions tending to keep that column substantially compact and under conditions wherein a disengaging surface is provided within and near the bottom of said column which disengaging surface is so proportioned as to permit the passage of large amounts of reactant without disruption of the contact mass column and which surface usually and preferably is of substantially greater area than the cross-sectional area of the contact mass column.

In this specification, the term "contact mass column" has been utilized and we have spoken of its cross-sectional area. In practically all cases the contact mass column will be uniform in cross section throughout its length. However, in cases different designs are utilized in which constriction or enlargement of the contact mass column is brought about for some purpose or another, the term "cross-sectional area" is intended to mean average cross-sectional area, or in some few specialized cases, the minimum cross-sectional area of the column of contact mass material exclusive of the internal area occupied by heat transfer tubes, baffling structure, supporting structure of various kinds inside the reactor case, and other items occupying space which is not occupied by contact mass.

The term "disengaging surface" has likewise been used as as used herein is intended to mean the surface (projected) of the contact mass material bounding a free space into which free space reactant may escape to be separated from the adjacent contact mass material.

We claim:

1. A method for reacting a fluid in contact with a mass of subdivided solid particles which comprises maintaining a continuous compact bed of said solid particles under reaction conditions within a confined reaction zone from adjacent its upper extremity to its lower extremity, causing the particles of said bed to move downwardly through the reaction zone by continuously supplying particles to the upper portion of the bed and continuously removing particles from the lower portion of the bed, supplying a stream of said fluid to the upper portion of the reaction zone and reacting the fluid while passing downwardly through an upper portion of said bed, reversing the direction of flow of said fluid in a horizontally enlarged lower portion of said bed and discharging fluid from the enlarged portion of said bed at a plurality of spaced apart disengaging surfaces providing a greater total area for gas flow than the portion of said bed which is above said enlarged lower portion.

2. A process for the conversion of hydrocarbons which comprises maintaining a continuous compact bed of catalyst within a confined reaction zone from adjacent its upper extremity to its lower extremity, maintaining said bed at conversion conditions, causing the catalyst of said bed to move downwardly through the reaction zone by continuously supplying fresh catalyst to the upper portion of the bed and continuously removing contaminated cataylst from the lower portion of the bed, supplying a stream of hydrocarbons to the upper portion of the reaction zone and passing the same downwardly through an upper portion of said bed, providing a region of enlarged horizontal cross section in the lower portion of said reaction zone and bed relative to said upper portion of the bed, passing all of said stream of hydrocarbons downwardly within the enlarged lower portion of said bed and causing a reversal in the direction of flow of the hydrocarbons in the enlarged lower portion of the bed to effect a substantial disengagement of said hydrocarbons from said bed at a disengaging surface which is positioned entirely substantially below the beginning of said enlarged lower portion of said bed and which provides a substantially greater cross-sectional area for gas flow than the horizontal cross-sectional area of said bed above said enlarged lower portion of said bed and withdrawing said hydrocarbons from said disengaging surface of enlarged horizontal cross section.

3. A process for the conversion of hydrocarbons which comprises maintaining a continuous compact bed of catalyst within a confined reaction zone from adjacent its upper extremity to its lower extremity, maintaining said bed at conversion conditions, causing the catalyst of said bed to move downwardly through the reaction zone by continuously supplying fresh catalyst to the upper portion of the bed and continuously removing contaminated catalyst from the lower portion of the bed, supplying a stream of hydrocarbons to the upper portion of the reaction zone and passing the same downwardly through an upper portion of said bed, providing a region of enlarged horizontal cross section in the lower portion of said reaction zone and bed relative to said upper portion of the bed, providing a plurality of spaced apart collecting zones from which gravity flow of catalyst is substantially excluded within said enlarged region, causing a reversal in the direction of flow of the hydrocarbons in the enlarged portion of the bed at locations below each of said collecting zones and discharging conversion products upwardly from said locations in said enlarged portion of said bed into said collecting zones.

4. That method for the conversion of hydrocarbons in the presence of a particle-form solid contact mass material which comprises: moving the contact mass through a confined reaction zone as a compact downwardly flowing column, passing fluid reactants at reaction conditions longitudinally through said column and concurrently with the flow of said column, baffling the flow of said column within a horizontally enlarged portion of said column within the lower section of said column at a plurality of spaced locations to provide a plurality of spaced apart gas collecting zones from which gravity flow of contact material is substantially excluded, reversing the direction of flow of the fluid reactants within said enlarged portion of said column at areas immediately below each of said gas collecting zones to effect a substantial disengagement of said fluid reactants from the contact material, passing the fluid reactants upwardly into said gas collecting zones and withdrawing said fluid reactants from said gas collecting zones to a location outside of said reaction zone.

5. Apparatus for hydrocarbon conversion comprising: a substantially vertical, elongated vessel having along a lower portion of its length a vertical section of enlarged horizontal cross-sectional area, means to introduce contact material into the upper section of said vessel to maintain therein a substantially compact column of downwardly gravitating contact material particles, means to withdraw contact material from the lower section of said vessel below said enlarged section, means to introduce fluid reactants into the upper section of said vessel, baffling along substantially a single horizontal level within said enlarged section of said vessel adapted to define substantial gas collecting space from which direct gravity flow of contact material is excluded, which space is in free communication with the interior of said enlarged section of said vessel at a single level along substantial horizontal area at the lower extremity of said space, which area is substantially greater than the horizontal cross-sectional area of said vessel above said enlarged section, and means to withdraw fluid reactants from said space.

6. Apparatus for hydrocarbon conversion comprising: a substantially vertical, elongated vessel having along a lower portion of its length a vertical section of enlarged horizontal cross-sectional area, means to introduce contact material into the upper section of said vessel to maintain therein a substantially compact column of downwardly gravitating contact material particles, means to withdraw contact material from the lower section of said vessel below said enlarged section, means to introduce fluid reactants into the upper section of said vessel, a plurality of spaced apart inverted gas collecting troughs extending lengthwise horizontally across said enlarged section of said vessel along a substantially single elevational level, said troughs providing a total open area along their bottoms greater than that of said vessel above said enlarged section and means to withdraw gas from said collecting troughs.

7. A method for reacting a fluid in contact with a mass of subdivided solid particles which comprises maintaining a continuous compact bed of said solid particles within a confined reaction zone from adjacent its upper extremity to its lower extremity, causing the particles of said bed to move downwardly through the reaction zone by continuously supplying particles to the upper portion of the bed and continuously removing particles from the lower portion of the bed, supplying a stream of said fluid to the upper portion of the reaction zone and reacting the fluid while passing downwardly through an upper portion of said bed, reversing the direction of flow of said fluid in a horizontally enlarged lower portion of said bed and discharging fluid from the enlarged portion of said bed at a plurality of spaced disengaging surfaces providing a total cross-sectional area for fluid flow greater than the horizontal cross-sectional area of said bed above said enlarged lower portion.

8. That method for contacting gaseous materials with particle form solids which comprises: moving the particle form solids through a confined contacting zone as a substantially compact column of downwardly flowing solid particles, passing gaseous material downwardly within said column and concurrently with the flow of said solids, baffling the flow of said solids within an enlarged portion of said column within the lower section thereof at a plurality of spaced locations to provide a plurality of spaced apart gas collecting zones from which gravity flow of said solid particles is substantially excluded, reversing the direction of flow of said gaseous material within said enlarged portion of said column at areas immediately below each of said gas collecting zones to effect a substantial disengagement of said gaseous material from the solids, the total of said areas being greater than the horizontal cross-sectional area for gas flow in said column above said enlarged portion passing the disengaged gaseous material into said gas collecting zones and withdrawing it therefrom to a location outside of said contacting zone.

9. A method for reacting a fluid in contact with a mass of subdivided solid particles which comprises: maintaining a continuous compact bed of said solid particles under reaction conditions within a confined reaction zone, causing the particles of said bed to move downwardly through the reaction zone by supplying particles to the upper portion of the bed and removing particles from the lower portion of the bed, passing said fluid downwardly within said bed in said reaction zone and reacting the fluid while passing downwardly through said bed, passing all of the fluid into a horizontally enlarged lower portion of said bed to first effect a substantial reduction in the linear rate of flow of the fluid and thereafter reversing the direction of flow of the fluid and disengaging the fluid from said bed at gas-solid disengagement surface, all of which surface is spaced substantially below the beginning of said enlarged lower portion of said bed and which provides a substantially greater total cross-sectional area for gas flow than the horizontal cross-sectional area of said bed above said enlarged lower portion, and withdrawing the disengaged fluid.

10. Apparatus for hydrocarbon conversion comprising a vertical shell defining a confined reaction space, said shell being of substantially constant horizontal cross-sectional area along the upper and major portions of its length and having adjacent its lower end a vertical section of substantially greater horizontal cross-sectional area than the portion of said shell thereabove, conduit means to feed particle-form solid contact material to the upper section of said shell to maintain therein a substantially compact column of downwardly moving solid particles, means to remove contact material from the lower section of said shell, a fluid reactant inlet member connecting into the upper section of said shell separately of said conduit means for feeding contact material, and means positioned within said enlarged section of said shell adapted to provide a disengaging surface for the separation of fluid reactant from the contact material column, which disengaging surface is of greater area than said upper portion of said shell which is of constant cross-sectional area.

THOMAS P. SIMPSON.
FREDERICK E. RAY.
RUSSELL LEE.

REFERENCES CITED

The following references are of record in the file of this patent:

UNITED STATES PATENTS

| Number | Name | Date |
| --- | --- | --- |
| 664,630 | Frasch | Dec. 25, 1900 |
| 1,174,464 | Agnew | Mar. 7, 1916 |
| 2,312,006 | Thiele | Feb. 23, 1943 |
| 2,348,156 | Sheppard | May 2, 1944 |
| 2,394,710 | McAfee | Feb. 12, 1946 |
| 2,400,194 | Day et al. | May 14, 1946 |